(12) United States Patent
Tseng

(10) Patent No.: US 6,170,845 B1
(45) Date of Patent: Jan. 9, 2001

(54) BICYCLE FRAME

(75) Inventor: Diing-Huang Tseng, Changhua Hsien (TW)

(73) Assignee: Merida Industry Co., Ltd. (TW)

( * ) Notice: Under 35 U.S.C. 154(b), the term of this patent shall be extended for 0 days.

(21) Appl. No.: 09/330,541

(22) Filed: Jun. 11, 1999

(51) Int. Cl.$^7$ ................................................. B62K 25/10
(52) U.S. Cl. ................................................. 280/284; 280/288
(58) Field of Search .................................. 280/284, 285, 280/286, 288, 283, 275; 180/227

(56) References Cited

U.S. PATENT DOCUMENTS

| | | | |
|---|---|---|---|
| 5,226,674 | * | 7/1993 | Buell et al. ............................ 280/284 |
| 5,791,674 | * | 8/1998 | D'Aluisio et al. ..................... 280/284 |
| 5,921,572 | * | 7/1999 | Bard et al. ............................. 280/284 |
| 6,076,845 | * | 6/2000 | Lawwill et al. ....................... 280/284 |

FOREIGN PATENT DOCUMENTS

3504101 * 4/1986 (DE) .................................... 280/284

* cited by examiner

*Primary Examiner*—Paul N. Dickson
*Assistant Examiner*—Avraham H. Lerner
(74) *Attorney, Agent, or Firm*—Thomas, Kayden, Horstemeyer & Risley, LLP

(57) ABSTRACT

A bicycle frame that provides a damping capability includes a downtube having a first end and a second end, a seat tube integrally extending from the downtube, a pair of chain stays pivotally connected to the downtube between the ends, a pair of linking rods each having a first arm pivotally connected to the second end of the downtube, a second arm and a third arm, a first damper having a cylinder body pivotally connected to the pair of chain stays and a first piston rod pivotally connected to the pair of linking rods between the first arms, a second damper having a second cylinder body pivotally connected to the seat tube, a second piston rod pivotally connected to the pair of linking rods between the second arms, and a spring disposed between the second cylinder and the second piston rod.

6 Claims, 6 Drawing Sheets

BICYCLE FRAME

FIELD OF THE INVENTION

The present invention relates to a bicycle frame and, more particularly, to a frame that can damp the vibration caused in the frame when a bicycle is travelling on a rough road.

BACKGROUND OF THE INVENTION

Bicycles are popular for transportation because they are inexpensive, easy to park, do not consume fossil fuels and do not pollute the environment. Consequently bicycle riding is both a leisure and competitive sport as well as a primary means of transportation in many parts of the world.

The frame, a basic component of the bicycle, is typically rigid, with wheels rotatably attached to the ends of the frame. In this configuration, the bicycle will inevitably vibrate and transmit the vibrations and shocks to the rider when the bicycle is travelling on a rough road. Consequently, numerous shock absorbing devices have been developed to isolate the shock and vibration from the rider.

SUMMARY OF THE INVENTION

The object of the present invention is to provide a frame that can effectively damp the shocks and vibrations generated when a bicycle is travelling on a rough surface.

DETAILED DESCRIPTION OF PREFERRED EMBODIMENT

Figure 1:
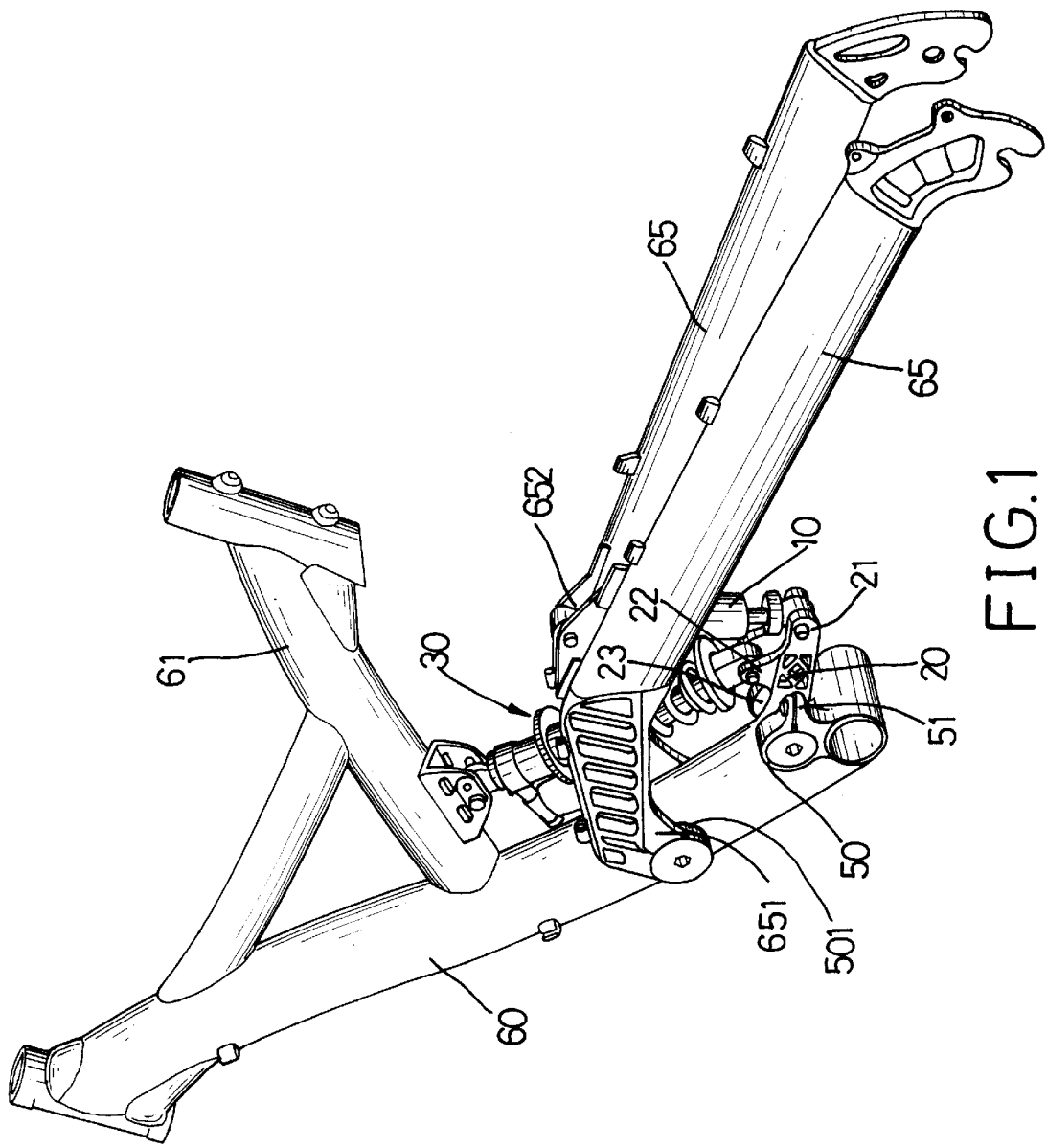
FIG. 1 is a perspective view of a preferred embodiment of a damping frame of a bicycle in accordance with the present invention.
Figure 2:
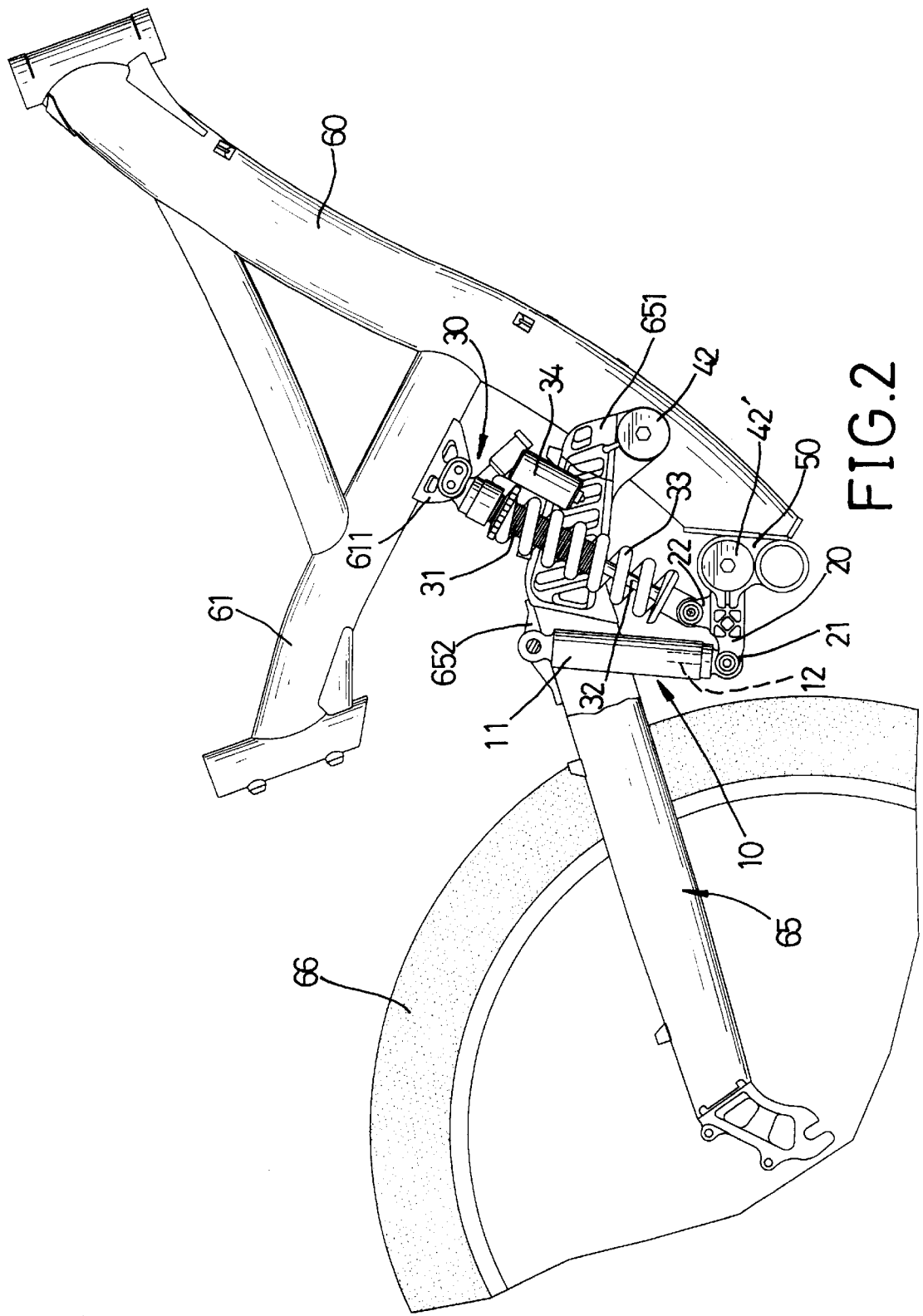
FIG. 2 is a side plan view of the damping frame shown in FIG. 1.

As shown in FIGS. 1 and 2, a damping frame for the use in a bicycle in accordance with the present invention includes a downtube (60) having a first end and a second end, a seat tube (61) integrally extending from the downtube (60), a pair of chain stays (65) pivotally connected at the proximal ends (651) thereof to the downtube (60) between the ends of the downtube (60) for rotatably mounting a rear wheel (66) between the distal ends thereof, a pair of linking rods (20) each having a first arm (21), a second arm (22) and a third arm (23), with the third arms (23) of the linking rods (20) pivotally connected to the second end of the downtube (60).

As an important feature of the present invention, the inventive damping frame includes a first damper (10) and a second damper (30). The first damper (10) has a first cylinder body (11) pivotally connected to lugs (652) formed on the chain stays (65) and a first piston rod (12) pivotally connected to the pair of linking rods (20) between the first arms (21).

The second damper (30) has a second cylinder (31) pivotally connected to the seat tube (61) between a pair of protrusions (611) formed on the tube (61), a second piston rod (32) pivotally connected to the pair of linking rods (20) between the second arms (22), and a spring (33) arranged between the second cylinder (31) and the second piston rod (32) thereof. A reservoir is (34) provided for supplying pressurized fluid, such as oil, to the second damper (30) and perhaps to the first damper (10).

Figure 5:
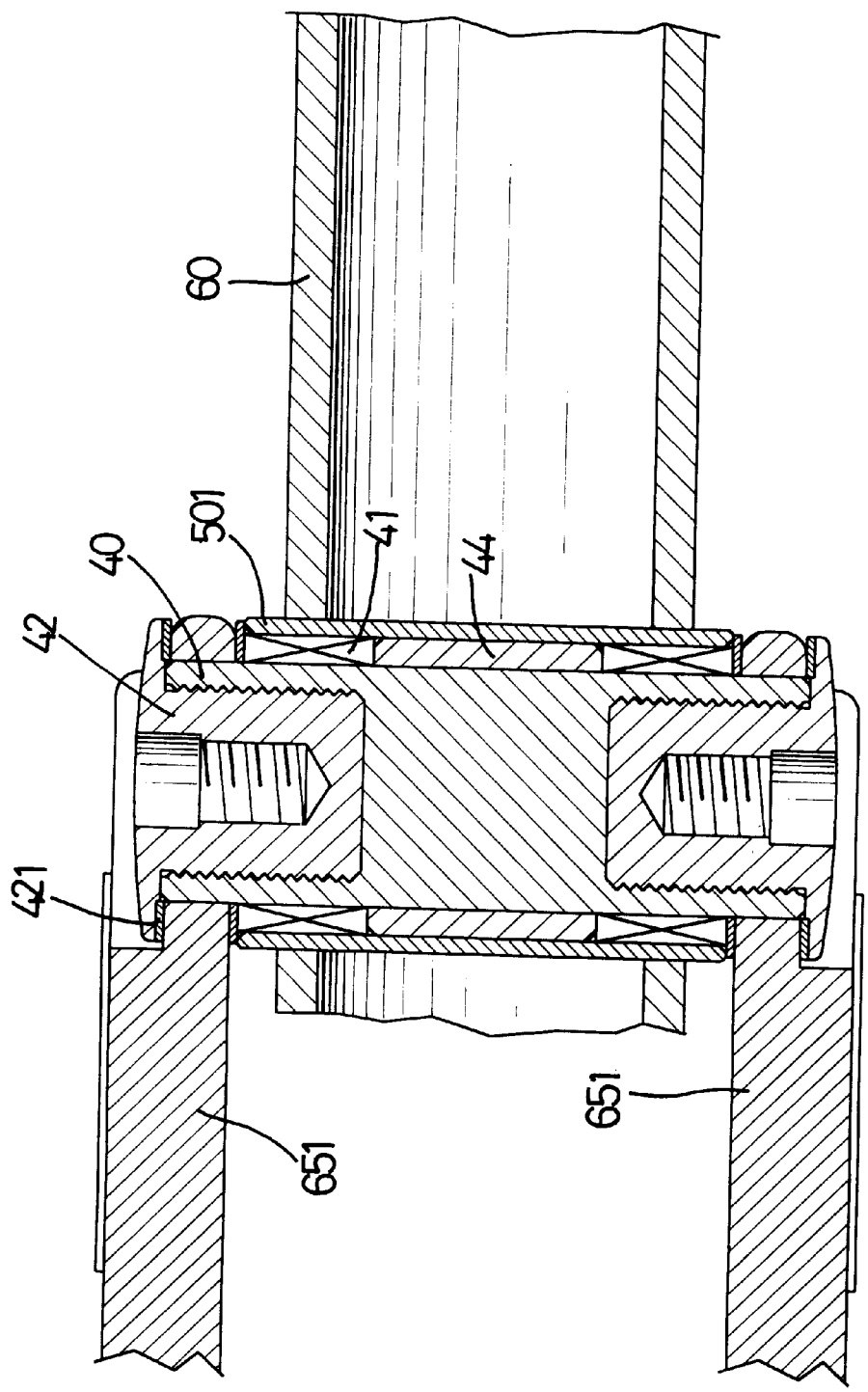
FIG. 5 is a top cross-sectional view of a first joint in the damping frame of FIG. 1.

Referring to FIG. 5, the chain stays (65) are pivotally connected to the downtube (60) by a first joint that includes a first sleeve (501) integrally formed in the downtube (60), a first axle (40) received in the first sleeve (501), a pair of bearings (41) disposed between the first sleeve (501) and the first axle (40), a spacer (44) between the bearings (41) and around the first axle (40), a pair of anti-friction rings (421) abutting the ends of the axle (40), and a pair of retainers (42) screwed into the ends of the axle (40) to retain the axle (40) in the first sleeve (501). The chain stays (65) are fastened to the axle (40), and so are pivotal with respect to the downtube (60).

Figure 6:
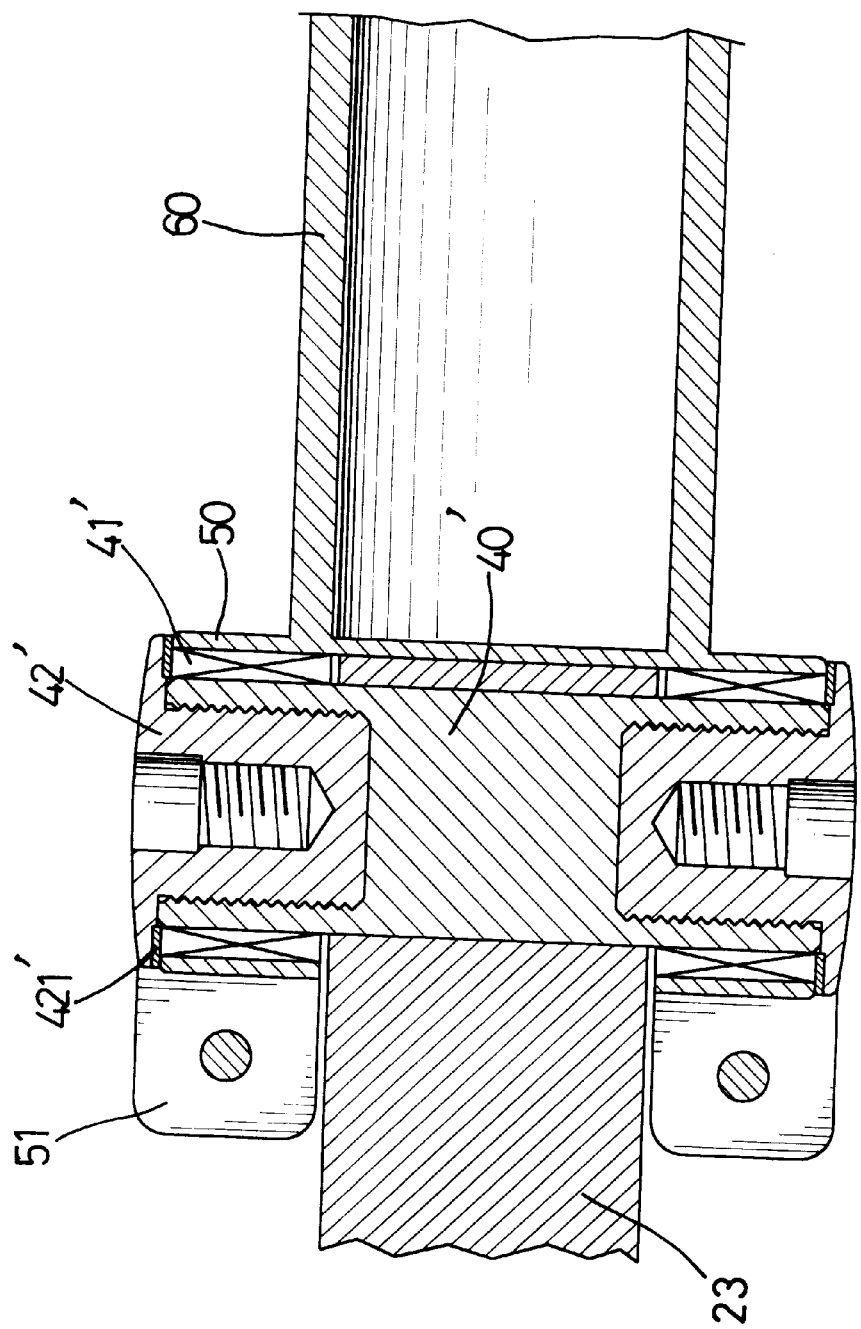
FIG. 6 is a top cross-sectional view of a second joint in the damping frame of FIG. 1.

Referring to FIG. 6, the third arms (23) of the linking rods (20) are pivotally connected to the second end of the downtube (60) through a second joint. The second joint includes a second sleeve (50) integrally formed at the second end of the downtube (60), a second axle (40') received in the second sleeve (50), a pair of bearings (41') disposed between the second sleeve (50) and the second axle (40'), a pair of anti-friction rings (421') abutting the ends of the axle (40), and a pair of retainers (42') threadedly engaged with the ends of the axle (40').

As illustrated, the second joint is substantially the same as the first joint shown in FIG. 5, except that the third arm (23) of the linking rod (20) is formed as a ring tightly mounted around the second axle (40') between the bearings (41'), and the second sleeve (50) has defined therein a split through which the linking rod (20) extends out the sleeve (50), and two pairs of lugs (51) formed on the edges of the split for clamping the bearings (41') when opposite lugs (51) are pressed towards each other.

Figure 3:
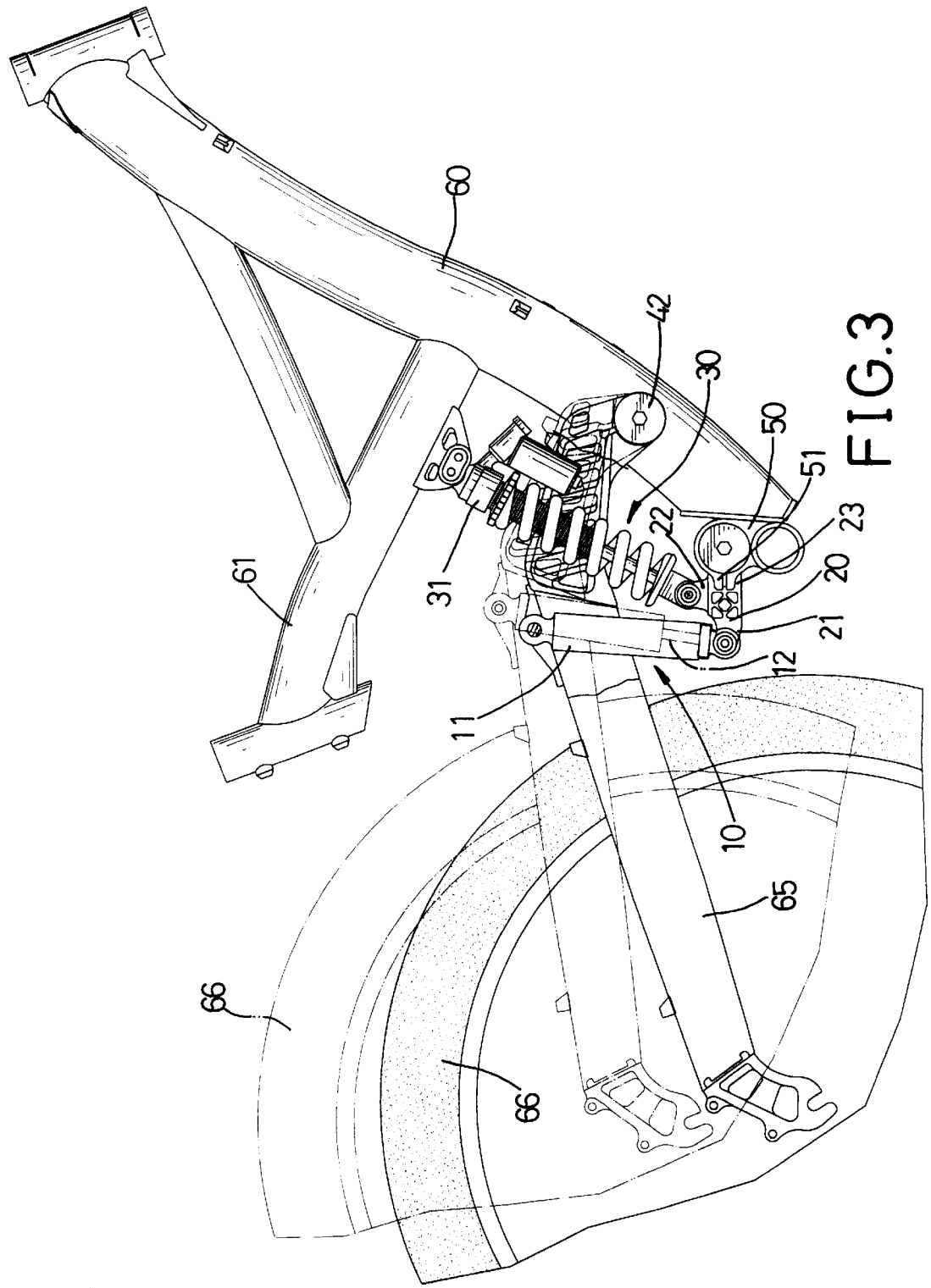
FIG. 3 is a side plan view of a pair of chain stays of the damping frame shown in FIG. 1 pivoted from the initial position thereof.
Figure 4:
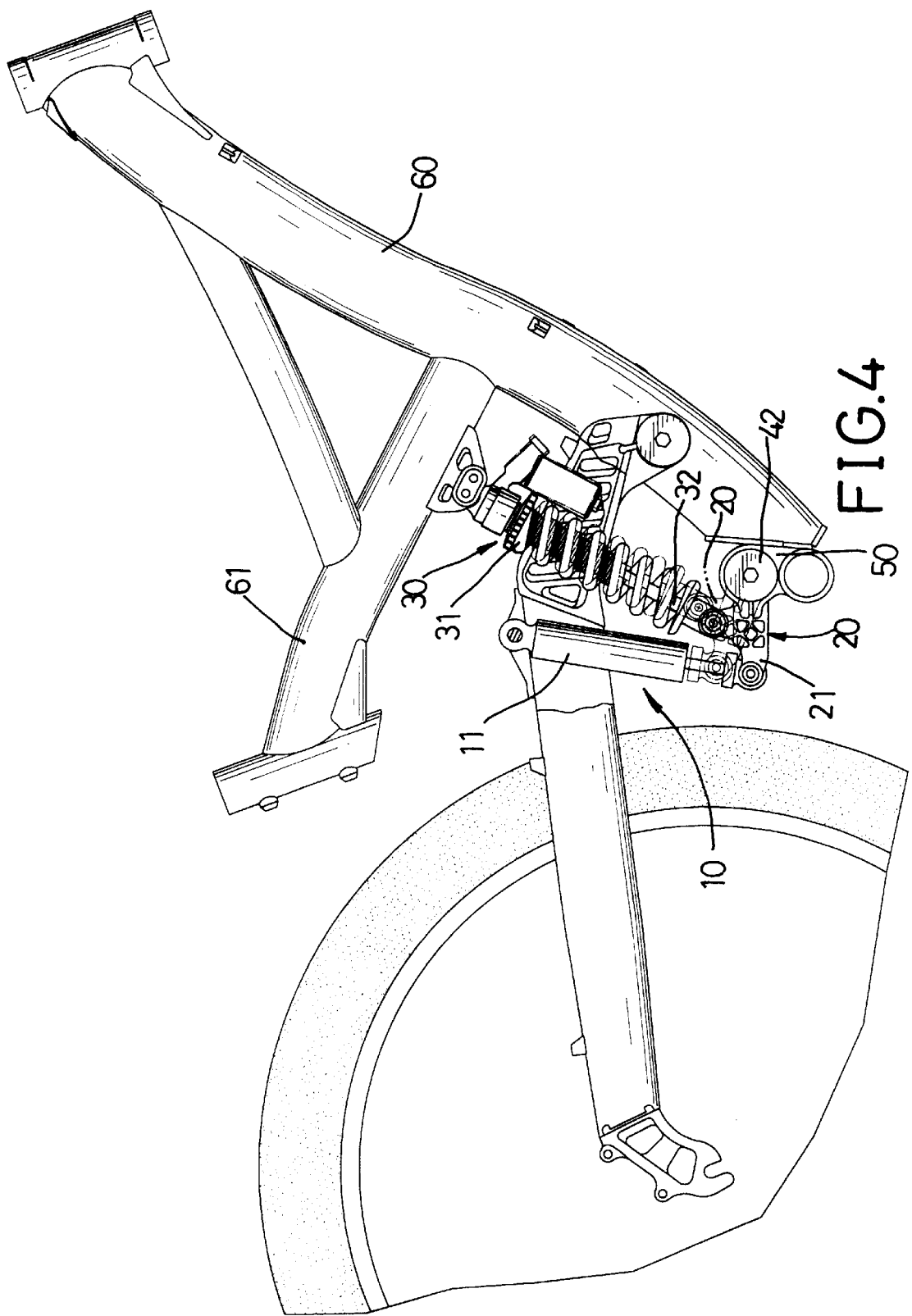
FIG. 4 is a side plan view of the pair of chain stays of the damping frame shown in FIG. 1 in the initial position thereof.

Referring to FIGS. 3 and 4, the pivotal connection between the chain stays (65) and the downtube (60) permits the pivotal movement of the stays (65) with respect to the downtube (60). When the rear wheel (66) is lifted, the first damper (10) is stretched and the second damper (30) is compressed, so that the dampers (10, 30) can provide damping to smooth the movement of the bicycle against vibration and provide a more comfortable feeling for a rider on the bike.

The damping frame in accordance with the present invention is advantageous in that it can absorb the vibration when the bicycle is travelling on a rough surface. Furthermore, the first and second joints involving the bearings (41, 41') and the axles (40, 40') may proved a reinforced structure of the damping frame.

What is claimed is:

1. A bicycle frame that provides a damping capability, comprising:
   a downtube having a first end and a second end;
   a seat tube integrally extending from said downtube;
   a pair of chain stays pivotally connected to said downtube between said ends;
   a pair of linking rods each having a first arm, a second arm and a third arm, said third arms of said linking rods being pivotally connected to said second end of said downtube;

a first damper having a cylinder body pivotally connected to said pair of chain stays and a first piston rod pivotally connected to said pair of linking rods between said first arms; and a second damper having a second cylinder body pivotally connected to said seat tube, a second piston rod pivotally connected to said pair of linking rods between said second arms, and a spring disposed between said second cylinder and said second piston rod.

2. The bicycle frame as claimed in claim 1 further including a first joint to provide pivotal movement between said chain stays and said downtube.

3. The bicycle frame as claimed in claim 2, wherein said first joint includes a first sleeve integrally formed in said downtube, a first axle received in said first sleeve, a pair of bearings disposed between said first sleeve and said first axle, a spacer between said bearings and around said first axle, a pair of anti-friction rings abutting said ends of said axle, and a pair of retainers threadedly engaged with said ends of said axle for retaining said axle in said first sleeve.

4. The bicycle frame as claimed in claim 1 further including a second joint to provide relative pivotal movement between said linking rod and said downtube.

5. The bicycle frame as claimed in claim 4, wherein said second joint includes a second sleeve integrally formed at said second end of said downtube, a second axle received in said second sleeve, a pair of bearings disposed between said second sleeve and said second axle, a pair of anti-friction rings abutting said ends of said axle, a pair of retainers screwed into said ends of said axle, a ring formed at the end of said linking rod and tightly mounted around said axle, and wherein said second sleeve has defined therein a split through which said linking rod extends out said sleeve, and pairs of lugs formed on the edges of said split for clamping said bearings when said corresponding lugs are squeezed towards each other.

6. The bicycle frame as claimed in claim 1 further including a reservoir provided for supplying pressurized fluid to said second damper.

* * * * *